(12) United States Patent
Jung et al.

(10) Patent No.: US 9,093,014 B2
(45) Date of Patent: Jul. 28, 2015

(54) THREE-DIMENSIONAL IMAGE DISPLAY DEVICE

(71) Applicant: Samsung Display Co., Ltd., Yongin, Gyeonggi-Do (KR)

(72) Inventors: Kyungho Jung, Bundang-gu (KR); Jinhwan Kim, Suwon-si (KR); Jeongmin Sung, Suwon-si (KR); Ilyong Yoon, Seoul (KR); Haeyoung Yun, Suwon-si (KR); Yong Cheol Jeong, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 358 days.

(21) Appl. No.: 13/771,573

(22) Filed: Feb. 20, 2013

(65) Prior Publication Data

US 2014/0098087 A1 Apr. 10, 2014

(30) Foreign Application Priority Data

Oct. 5, 2012 (KR) ........................ 10-2012-0110747

(51) Int. Cl.
*G09G 5/14* (2006.01)
*H04N 13/04* (2006.01)
*G09G 3/00* (2006.01)
*G09G 3/36* (2006.01)

(52) U.S. Cl.
CPC .................. *G09G 5/14* (2013.01); *G09G 3/003* (2013.01); *H04N 13/042* (2013.01); *H04N 13/045* (2013.01); *H04N 13/0497* (2013.01); *G09G 3/3611* (2013.01)

(58) Field of Classification Search
CPC ....... G09G 3/003; G09G 5/14; G09G 3/3614; H04N 13/0438; H04N 13/0497; H04N 13/045
See application file for complete search history.

(56) References Cited

U.S. PATENT DOCUMENTS

| 7,710,648 | B2 | 5/2010 | Chestak et al. |
| 7,826,136 | B2 | 11/2010 | Koo et al. |
| 8,077,117 | B2 | 12/2011 | Kim et al. |
| 2010/0039573 | A1 | 2/2010 | Park et al. |
| 2010/0289873 | A1 | 11/2010 | Miyauchi et al. |
| 2011/0074938 | A1* | 3/2011 | Nakahata ........................ 348/56 |
| 2011/0267341 | A1 | 11/2011 | Jung et al. |

(Continued)

FOREIGN PATENT DOCUMENTS

| JP | 2011082615 A | 4/2011 |
| KR | 1020070070327 A | 7/2007 |

(Continued)

*Primary Examiner* — Kevin Nguyen
(74) *Attorney, Agent, or Firm* — Cantor Colburn LLP

(57) ABSTRACT

A three-dimensional image display device includes: a display panel which includes a first pixel and a second pixel and displays a frame image including a positive frame image including a first right-eye image and a first left-eye image displayed in the first and second pixels, respectively, and a negative frame image including a second left-eye image and a second right-eye image displayed in the first and second pixels, respectively; and a liquid crystal lens panel disposed on the display panel and which provides the first and second right-eye images to a right eye of a viewer and provides the first and second left-eye images to a left eye of the viewer, where the display panel sequentially displays the positive frame image and the negative frame image during an n-th frame period, and the negative frame image and the positive frame image during an (n+1)-th frame image.

22 Claims, 16 Drawing Sheets

(56) References Cited

U.S. PATENT DOCUMENTS

2011/0292041 A1   12/2011   Lee et al.
2012/0162172 A1*  6/2012    Lee et al. ................. 345/209
2012/0236132 A1*  9/2012    Takahashi ................. 348/58

FOREIGN PATENT DOCUMENTS

| KR | 1020120087647 A | 8/2012 |
| KR | 1020130060637   | 6/2013 |
| KR | 1020140053741   | 5/2014 |

\* cited by examiner

Fig. 4A

| R1 | L1 | R1 | L1 | R1 | L1 |
|----|----|----|----|----|----|
| R1 | L1 | R1 | L1 | R1 | L1 |
| R1 | L1 | R1 | L1 | R1 | L1 |
| R1 | L1 | R1 | L1 | R1 | L1 |
| R1 | L1 | R1 | L1 | R1 | L1 |
| R1 | L1 | R1 | L1 | R1 | L1 |

| L2 | R2 | L2 | R2 | L2 | R2 |
|----|----|----|----|----|----|
| L2 | R2 | L2 | R2 | L2 | R2 |
| L2 | R2 | L2 | R2 | L2 | R2 |
| L2 | R2 | L2 | R2 | L2 | R2 |
| L2 | R2 | L2 | R2 | L2 | R2 |
| L2 | R2 | L2 | R2 | L2 | R2 |

LR

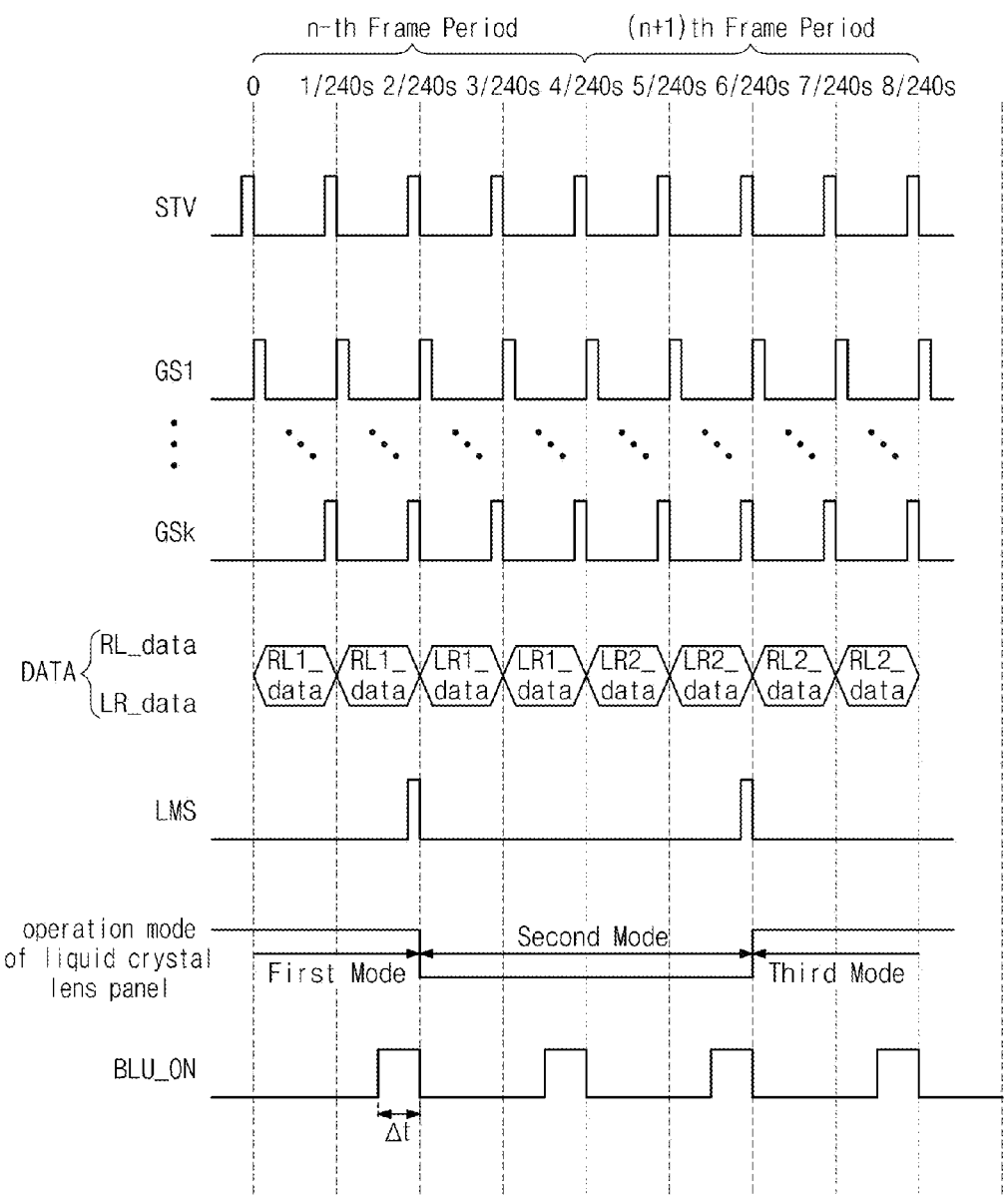

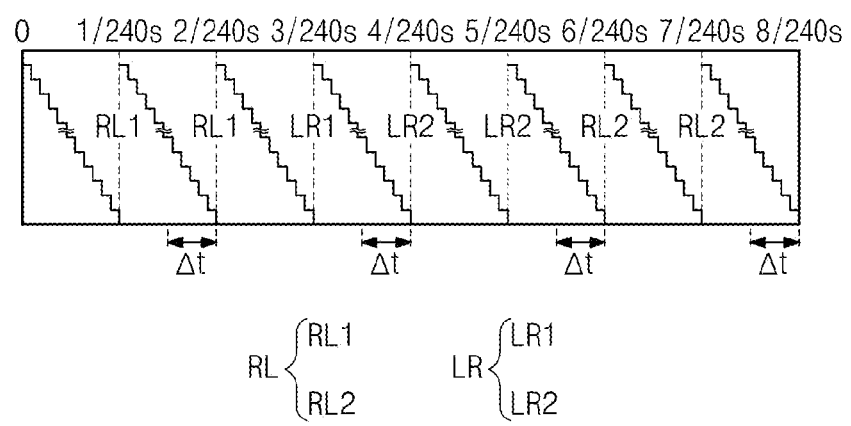

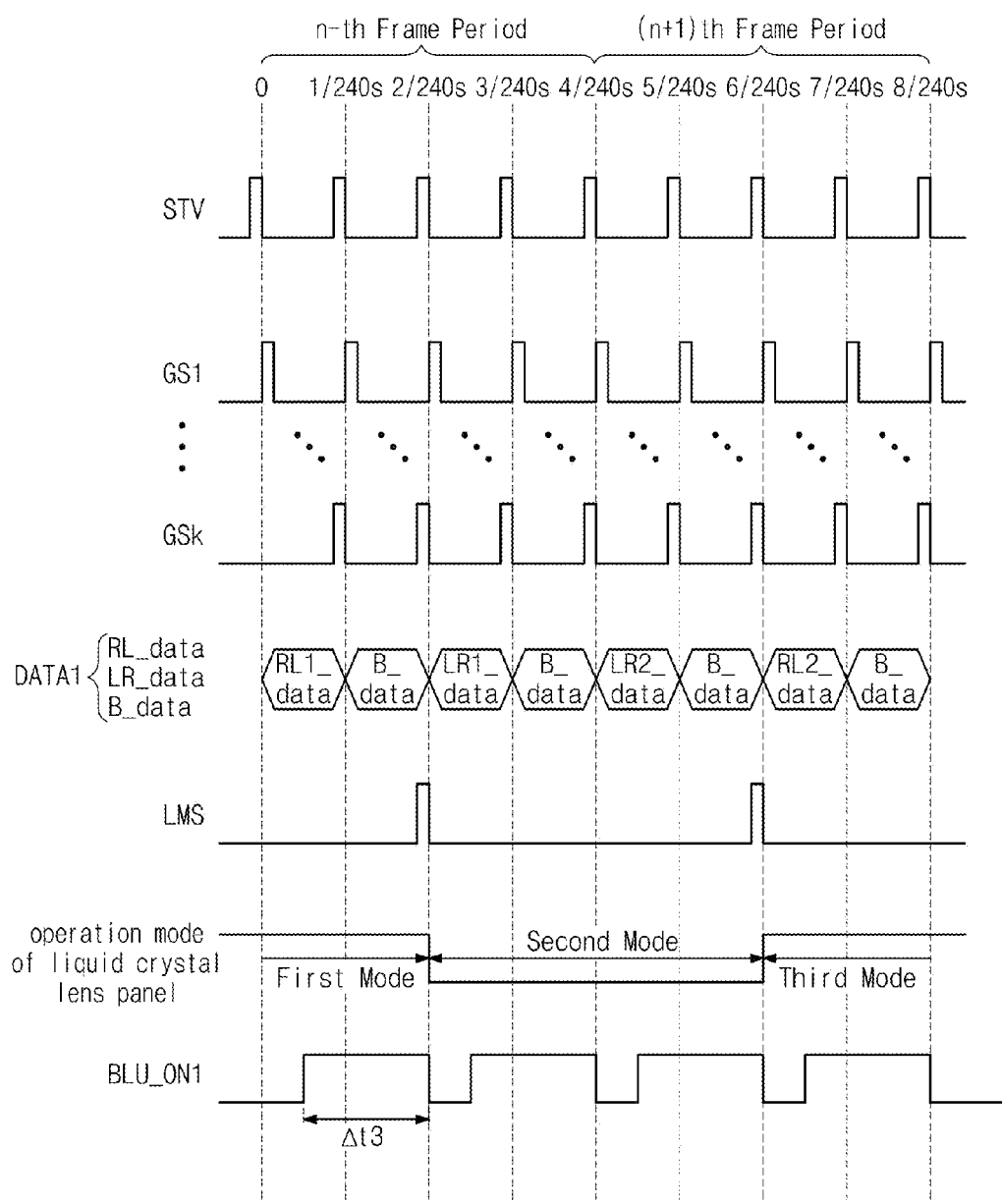

THREE-DIMENSIONAL IMAGE DISPLAY DEVICE

This application claims priority to Korean Patent Application No. 10-2012-0110747, filed on Oct. 5, 2012, and all the benefits accruing therefrom under 35 U.S.C. §119, the content of which in its entirety is herein incorporated by reference.

BACKGROUND

1. Field

The disclosure relates to a display device. More particularly, the disclosure relates to a glassless-type three-dimensional display device capable of displaying a three-dimensional.

2. Description of the Related Art

In general, a three-dimensional ("3D") image display device displays a 3D image using a binocular disparity method, which provides a left-eye image and a right-eye image, which have a binocular disparity, to a left eye and a right eye of a viewer, respectively.

The binocular disparity method is typically classified into a glass type method and a glassless type method. The glass type method changes a polarization direction of the left-eye image and the right-eye image using a patterned retarder or alternately displays the left-eye image and the right-eye image, thereby displaying the 3D image.

A glassless-type 3D image display device typically includes a barrier panel or a liquid crystal lens panel to provide optical axes for the left-eye image and the right-eye image. The glassless-type 3D image display device employing the liquid crystal lens panel may control an operation mode of the liquid crystal lens panel and provide the left-eye image and the right-eye image to the left and right eyes of the viewer.

The liquid crystal lens panel typically includes a first substrate, a second substrate facing the first substrate, a first electrode disposed on the first substrate, a second electrode disposed on the second substrate, and a liquid crystal layer disposed between the first substrate and the second substrate. The liquid crystal lens panel controls voltages applied to the first and second electrodes, respectively, and changes an arrangement of liquid crystal molecules of the liquid crystal layer, thereby controlling the operation mode thereof In the liquid crystal lens panel, the liquid crystal molecules may have slow response speed, and the change of the operation mode of the liquid crystal lens panel may be thereby slow, such that the left-eye image may be perceived by the left eye of the viewer or the right-eye image may be perceived by the right eye of the viewer.

SUMMARY

The disclosure provides a three-dimensional ("3D") image display device with improved brightness of an image, in which left-eye images is effectively prevented from being mixed with right-eye images.

Exemplary embodiments of the invention provide a 3D image display device includes a display panel which displays a frame image and a liquid crystal lens panel. In such an embodiment, the display panel includes a first pixel and a second pixel different from the first pixel. In such an embodiment, the frame image includes a positive frame image and a negative frame image. In such an embodiment, the positive frame image includes a first right-eye image displayed in the first pixel and a first left-eye image displayed in the second pixel and the negative frame image includes a second left-eye image displayed in the first pixel and a second right-eye image displayed in the second pixel. In such an embodiment, the liquid crystal lens panel is disposed on the display panel to provide the first and second right-eye images to a right eye of a viewer and provide the first and second left-eye images to a left eye of a viewer. In such an embodiment, the display panel displays the positive frame image and the negative frame image during an n-th frame period (n is a natural number) in the order of the positive frame image and the negative frame image and displays the negative frame image and the positive frame image during an (n+1)-th frame image in the order of the negative frame image and the positive frame image.

In an exemplary embodiment, the liquid crystal lens panel has a driving frequency equal to or lower than one-fourth of a driving frequency of the display panel.

In an exemplary embodiment, an operation mode of the liquid crystal lens panel is changed at a time point at which the positive frame image is changed to the negative frame image and at a time point at which the negative frame image is changed to the positive frame image.

In an exemplary embodiment, the 3D image display device further includes a backlight unit which provides light to the display panel during a portion of the time period during which the positive frame image is displayed and a portion of the time period during which the negative frame image is displayed.

In an exemplary embodiment, a three-dimensional 3D image display device includes: a display panel which includes h pixels and displays a frame image, where h is a natural number equal to or greater than 2, and the frame image includes: a positive frame image including first to h-th positive multi-view point images displayed through the h pixels in a first order and having different view points from each other; and a negative frame image including first to h-th negative multi-view point images displayed through the h pixels in a second order and having different view points from each other; and a liquid crystal lens panel disposed on the display panel, where the liquid crystal lens panel provides an i-th positive multi-view point image among the first to h-th positive multi-view point images and a j-th negative multi-view point image among the first to h-th negative multi-view point images to a right eye of a viewer and provide a j-th positive multi-view point image among the first to h-th positive multi-view point images and an i-th negative multi-view point image among the first to h-th negative multi-view point images to a left eye of the viewer, where i is a natural number equal to or less than h, and j is a natural number equal to or less than h and different from i, where the display panel sequentially displays the positive frame image and the negative frame image during an n-th frame period and sequentially displays the negative frame image and the positive frame image during an (n+1)-th frame period, where n is a natural number.

According to exemplary embodiments, the number of the operation mode changes of the liquid crystal lens panel is reduced when compared to the number of the operation mode changes of a convention liquid crystal lens panel, thereby substantially reducing the image confusion phenomenon, which is caused by the response speed of liquid crystals. In such embodiments, when a level of the image confusion is maintained substantially in the same as a level of the image confusion of the conventional 3D image display device, brightness of the display panel is substantially improved.

BRIEF DESCRIPTION OF THE DRAWINGS

The above and other features of the invention will become readily apparent by reference to the following detailed description when considered in conjunction with the accompanying drawings, in which:

FIG. 4A is a plan view showing a positive frame image displayed on the display panel shown in FIG. 3;

FIG. 4B is a plan view showing a negative frame image displayed on the display panel shown in FIG. 3;

FIG. 7 is a signal timing diagram showing a vertical start signal, gate signals, a frame data, a mode change signal, an operation mode of the liquid crystal lens panel, and a backlight-on signal of an exemplary embodiment of a display panel according to the invention;

FIG. 8 is a view showing a frame image corresponding to the frame data of FIG. 7;

FIG. 10 is a signal timing diagram showing a vertical start signal, gate signals, a frame data, a mode change signal, an operation mode of the liquid crystal lens panel, and a backlight-on signal of an alternative exemplary embodiment of a display panel according to the invention;

DETAILED DESCRIPTION

Figure 1:
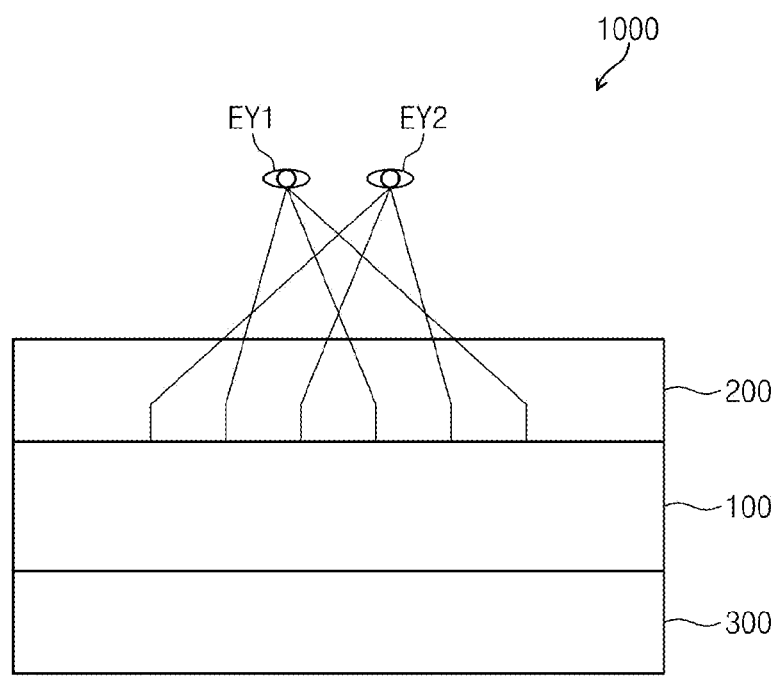
FIG. 1 is a schematic cross-sectional view showing an exemplary embodiment of a three-dimensional ("3D") image display device according to the invention.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein Hereinafter, exemplary embodiments of the invention will be described in detail with reference to the accompanying drawings.

Figure 2:
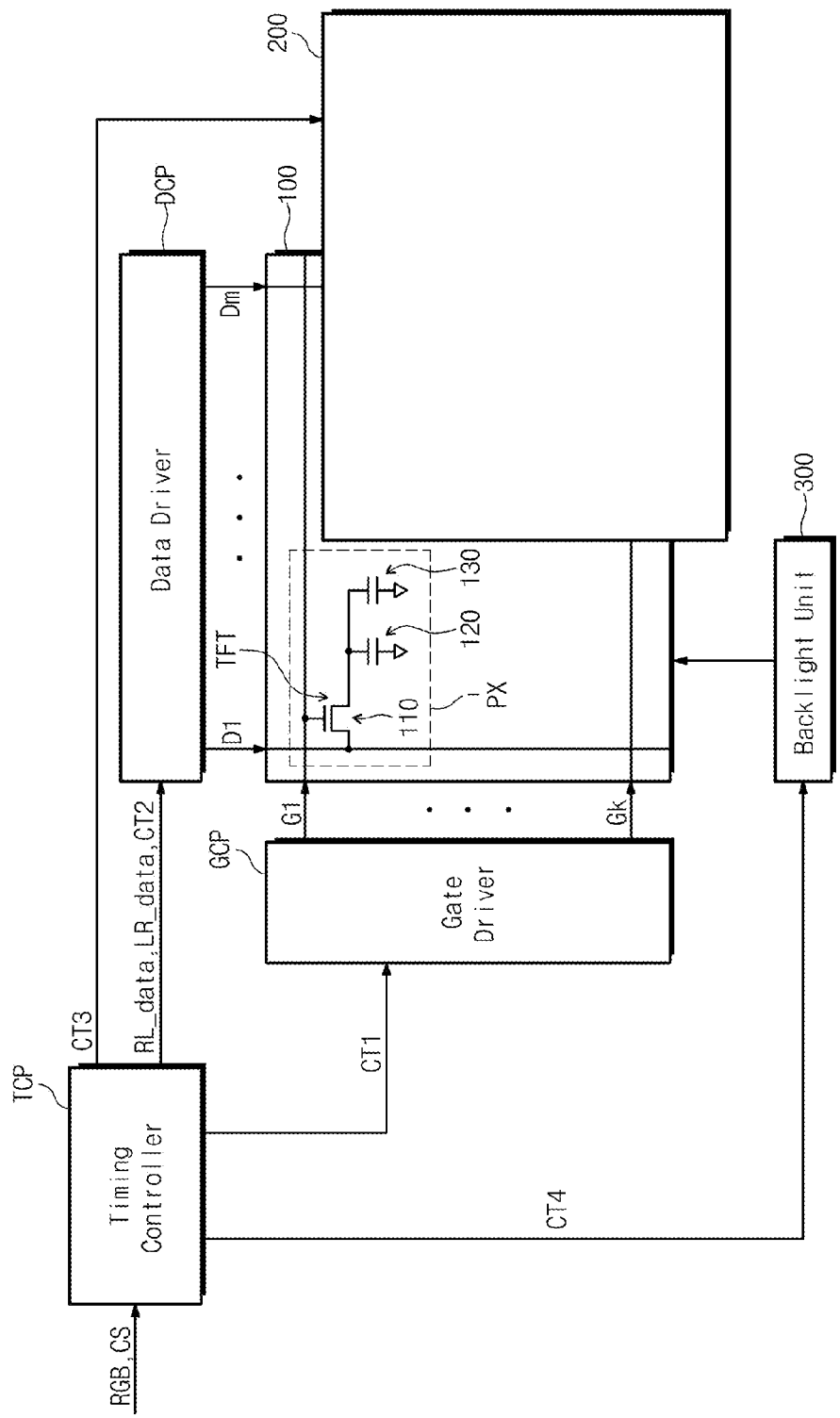
FIG. 2 is a block diagram showing the 3D image display device shown in FIG. 1.

FIG. 1 is a view showing an exemplary embodiment of a three-dimensional ("3D") image display device according to the invention, and FIG. 2 is a block diagram showing the 3D image display device shown in FIG. 1.

Referring to FIGS. 1 and 2, the 3D image display device 1000 includes a display panel 100, a liquid crystal lens panel 200, a backlight unit 300 and a driver.

The display panel 100 operates in a two-dimensional ("2D") mode or a 3D mode in response to a selection signal generated based on a control of a viewer. The display panel 100 displays a 2D image during the 2D mode and a 3D image during the 3D mode. The image displayed in the 2D mode is perceived by the viewer as the 2D image, and the image displayed in the 3D mode is perceived by the viewer as the 3D image.

Hereinafter, the operation in the 3D mode of the display panel 100 will be described in detail, and the operation in the 2D mode of the display panel 100 will be omitted.

Various display panels, e.g., a liquid crystal display panel, an organic light emitting display panel, an electrophoretic display panel, an electrowetting display panel, etc., may be used as the display panel 100.

Hereinafter, an exemplary embodiment where the display panel 100 includes the liquid crystal display panel that includes two substrates and a liquid crystal layer disposed between the two substrates will be described for convenience of description. In such an embodiment, the display device including the liquid crystal display panel further includes a pair of polarizing plates (not shown) facing each other while interposing the liquid crystal display panel therebetween.

The display panel 100 includes a plurality of gate lines G1 to Gk that receives gate signals and a plurality of data lines D1 to Dm that receives data voltages. The gate lines G1 to Gk are insulated from the data lines D1 to Dm while crossing the data lines D1 to Dm.

The display panel 100 includes a plurality of pixel areas arranged substantially in a matrix form and a plurality of pixels arranged in the pixel areas, respectively. FIG. 2 shows an equivalent circuit diagram of a pixel PX of the pixels. The pixel PX includes a thin film transistor ("TFT" in FIG. 2) 110, a liquid crystal capacitor 120 and a storage capacitor 130.

The thin film transistor 110 includes a gate electrode, a source electrode and a drain electrode. The gate electrode is connected to a corresponding gate line, e.g., a first gate line G1, among the gate lines G1 to Gk, the source electrode is connected to a corresponding data line, e.g., a first data line D1, among the data lines D1 to Dm, and the drain electrode is connected to the liquid crystal capacitor 120 and the storage capacitor 130. The liquid crystal capacitor 120 and the storage capacitor 130 are connected to the drain electrode in parallel.

In an exemplary embodiment, the display panel 100 includes a first display substrate, a second display substrate disposed opposite to, e.g., facing, the first display substrate, and a liquid crystal display layer interposed between the first display substrate and the second display substrate.

The first display substrate includes the gate lines G1 to Gk, the data lines D1 to Dm, the thin film transistor 110 and a first electrode (not shown) of the liquid crystal capacitor 120, which are disposed thereon. The thin film transistor 110 applies the data voltage to the first electrode in response to the gate signal.

The second display substrate includes a second electrode (not shown) of the liquid crystal capacitor 120, which is disposed thereon, and the second electrode is applied with a reference voltage. The liquid crystal display layer serves as a dielectric substance between the first electrode and the second electrode. The liquid crystal capacitor 120 is charged with a voltage corresponding to an electric potential difference between the data voltage and the reference voltage.

Figure 3:
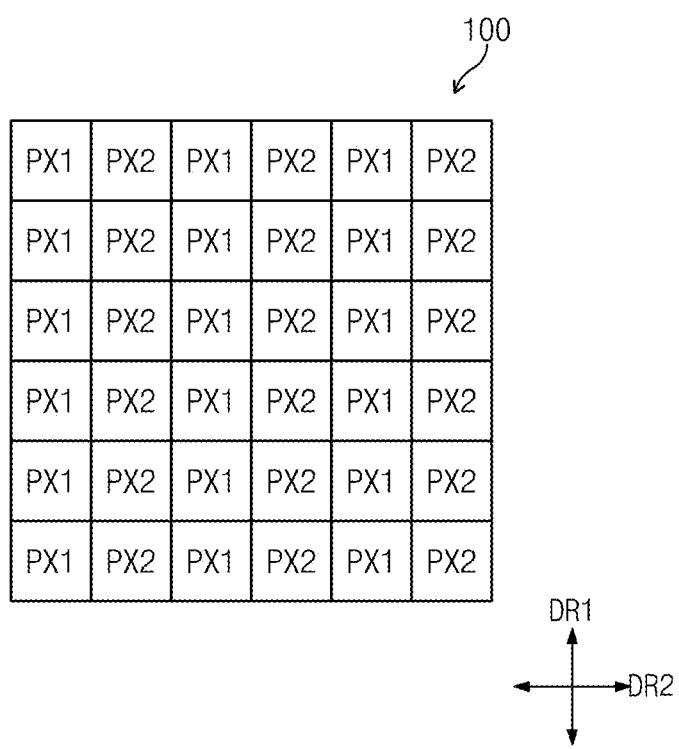
FIG. 3 is a plan view showing a portion of an exemplary embodiment of a display panel shown in FIG. 2.

FIG. 3 is a plan view showing a portion of the display panel 100 shown in FIG. 2. Particularly, FIG. 3 shows thirty-six pixels arranged in a matrix form with six rows by six columns.

The display panel 100 includes first pixels PX1 and second pixels PX2 different from the first pixels PX1. In such an embodiment, the first pixels PX1 are successively arranged in a first direction DR1, and the second pixels PX2 are successively arranged in the first direction DR1. In such an embodiment, the first pixels PX1 are alternately arranged with the second pixels PX2 in a second direction DR2, which is substantially perpendicular to the first direction DR1.

FIG. 4A is a plan view showing a positive frame image RL displayed on the display panel 100 shown in FIG. 3, and FIG. 4B is a plan view showing a negative frame image LR displayed on the display panel 100 shown in FIG. 3.

Referring to FIGS. 1, 3, 4A and 4B, the display panel 100 displays a frame image. The frame image includes the positive frame image and the negative frame image.

The positive frame image RL includes a first right-eye image R1 displayed in the first pixels PX1 and a first left-eye image L1 displayed in the second pixels PX2.

The negative frame image LR includes a second left-eye image L2 displayed in the first pixels PX1 and a second right-eye image R2 displayed in the second pixels PX2.

In such an embodiment, the first and second right-eye images R1 and R2 are provided to a right eye of the viewer (EY2 in FIG. 1) and the first and second left-eye images L1 and L2 are provided to a left eye (EY1 in FIG. 1) of the viewer.

The display order of the positive frame image RL and the negative frame image LR will be described later in detail.

Referring to FIGS. 1, 2, 4A and 4B, the liquid crystal lens panel 200 is disposed on the display panel 100. The liquid crystal lens panel 200 provides the first and second right-eye images R1 and R2 to the right eye EY2 of the viewer, and provides the first and second left-eye images L1 and L2 to the left eye EY1 of the viewer. In an exemplary embodiment, the liquid crystal lens panel 200 refracts light of the image displayed on the display panel 100 to allow the image to be formed on the left eye EY1 or the right eye EY2.

The liquid crystal lens panel 200 is turned off when the display panel 100 operates in the 2D mode, and turned on when the display panel 100 operates in the 3D mode.

The backlight unit 300 is disposed under the display panel 100 to provide light to the display panel 100.

In an exemplary embodiment, the backlight unit 300 performs a blinking operation to provide the light to the display panel 100 during a predetermined time period. In such an embodiment, the backlight unit 300 may provide the light to the display panel 100 during a portion of the time period, in which the positive frame image RL is displayed, and a portion of the time period, in which the negative frame image LR is displayed.

The driver includes a timing controller TCP, a gate driver GCP, and a data driver DCP.

The timing controller TCP receives image signals RGB and a control signal CS from an external device, e.g., a graphic controller (not shown). The image signals RGB are 2D image signals.

The timing controller TCP generates a positive frame data RL_data and a negative frame data LR_data based on the image signals RGB, and provides the positive frame data RL_data and the negative frame data LR_data to the data driver DCP.

The timing controller TCP receives the control signals CS, e.g., a vertical synchronization signal, a horizontal synchronization signal, a main clock, a data enable signal, etc., and outputs a first control signal CT1, a second control signal CT2, a third control signal CT3 and a fourth control signal CT4.

The first control signal CT1 controls the operation of the gate driver GCP. The first control signal CT1 includes a vertical start signal that starts the operation of the gate driver GCP, a gate clock signal that determines an output timing of the gate voltage, an output enable signal that determines an on-pulse width of the gate voltage, and a 3D synchronization signal, for example.

The second control signal CT2 controls the operation of the data driver DCP. The second control signal CT2 includes a horizontal start signal that starts the operation of the data driver DCP, a polarity inversion signal that inverts the polarity of the data voltage, an output indicating signal that determines an output timing of the data voltage from the data driver DCP, and the 3D synchronization signal, for example.

The third control signal CT3 controls the operation of the liquid crystal lens panel 200. The third control signal CT3 includes the 3D synchronization signal that allows the liquid crystal lens panel 200 to be synchronized with the display panel 100 and a mode change signal that changes an operation mode of the liquid crystal lens panel 200.

The fourth control signal CT4 controls the operation of the backlight unit 300. The fourth control signal CT4 includes the backlight-on signal that determines the turn-on period of the backlight unit 300.

The gate driver GCP is electrically connected to the gate lines G1 to Gk disposed on the display panel 100 and applies the gate signals to the gate lines G1 to Gk. In such an embodiment, the gate driver GCP generates the gate signals based on the first control signal CT1 to drive the gate lines G1 to Gk, and sequentially applies the generated gate signals to the gate lines G1 to Gk.

The data driver DCP converts the positive frame data RL_data and the negative frame data LR_data and outputs the positive frame data RL_data and the negative frame data LR_data to the data lines D1 to Dm, such that the positive frame image RL corresponding to the positive frame data RL_data and the negative frame image LR corresponding to the negative frame data LR_data are displayed on the display panel 100.

Figure 5:
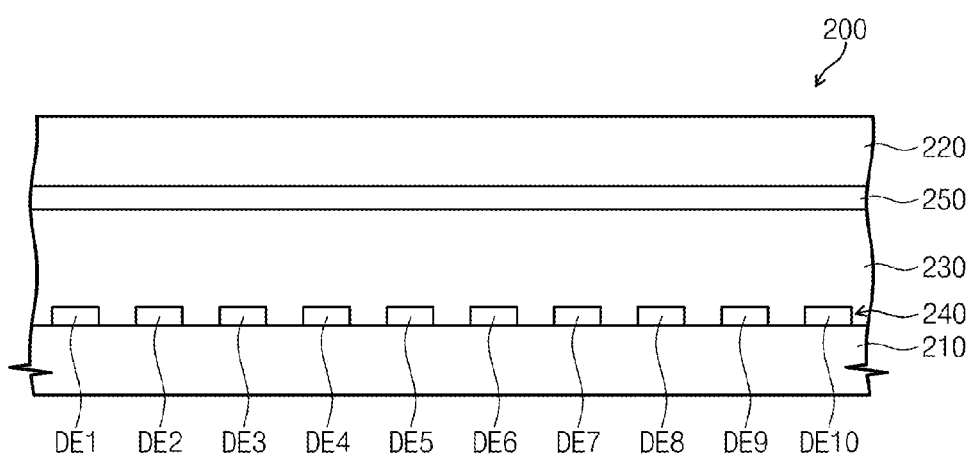
FIG. 5 is a cross-sectional view showing a portion of a liquid crystal lens panel shown in FIG. 1.

FIG. 5 is a cross-sectional view showing a portion of the liquid crystal lens panel shown in FIG. 1.

Referring to FIG. 5, the liquid crystal lens panel 200 includes a first substrate 210, a second substrate 220 disposed opposite to, e.g., facing, the first substrate 210, a liquid crystal layer 230 disposed between the first substrate 210 and the second substrate 220, a first electrode layer 240, and a second electrode layer 250.

The first electrode layer 240 is disposed on the first substrate 210. The first electrode layer 240 includes a plurality of driving electrodes DE1 to DE10 spaced apart from each other. The driving electrodes DE1 to DE10 are applied with a driving voltage. The first electrode layer 240 may include a transparent conductive material. FIG. 5 shows a portion of the liquid crystal lens panel 200 including ten driving electrodes DE1 to DE10 spaced apart from each other.

The second electrode layer 250 is disposed on the second substrate 220 and disposed opposite to the first electrode layer 240. The second electrode layer 250 is disposed covering substantially an entire surface of the second substrate 220. The second electrode layer 250 is applied with a common voltage. The second electrode layer 250 may include a transparent conductive material.

In an exemplary embodiment, the liquid crystal lens panel 200 further includes a first alignment layer (not shown) and a second alignment layer (not shown). The first alignment layer is disposed on the first electrode layer 240 and in contact with the liquid crystal layer 230. The second alignment layer is disposed on the second electrode layer 250 and in contact with the liquid crystal layer 230.

The liquid crystal lens panel 200 may operate in a first mode or a second mode different from the first mode.

The liquid crystal layer 230 controls an arrangement of the liquid crystal molecules based on the driving voltage and the common voltage to change the operation mode of the liquid crystal lens panel 200.

The liquid crystal lens panel 200 serves as a plurality of convex lenses, each of which has a focus. The focus of the liquid crystal lens panel 200 is changed based on the operation mode of the liquid crystal lens panel 200. Here, the focus of the liquid crystal lens panel 200 may be a point, at which the image refracted by the liquid crystal layer 230 is formed.

The driving voltage is changed at a time point at which the first mode and the second mode are changed to each other.

Figure 6A:
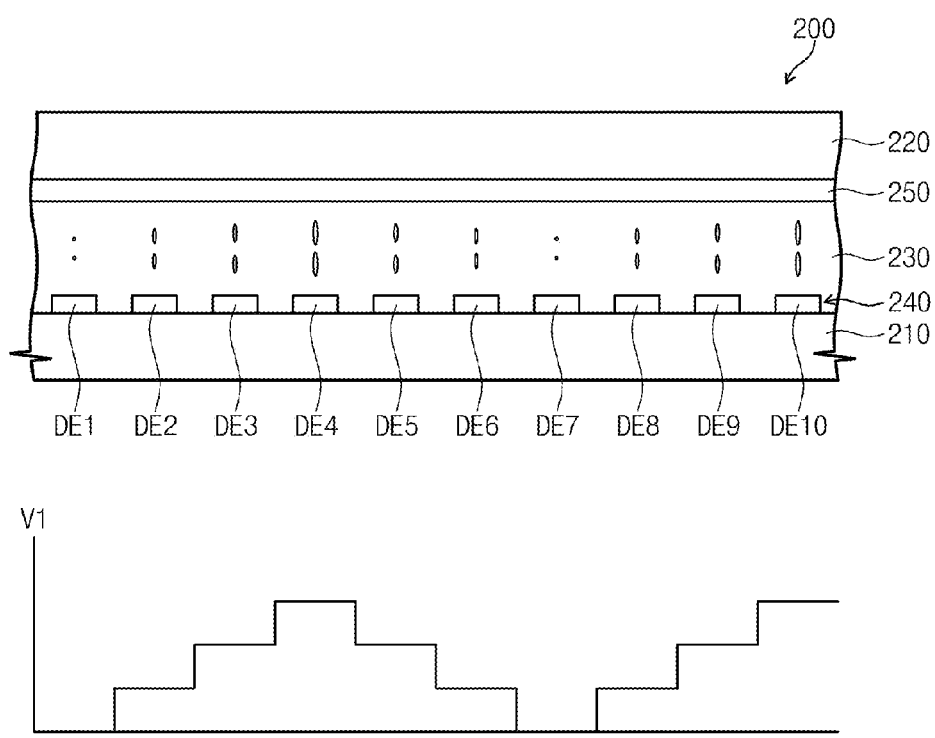
FIG. 6A is a cross-sectional view showing an exemplary embodiment of a liquid crystal lens panel operated in a first mode with a first driving voltage.
Figure 6B:
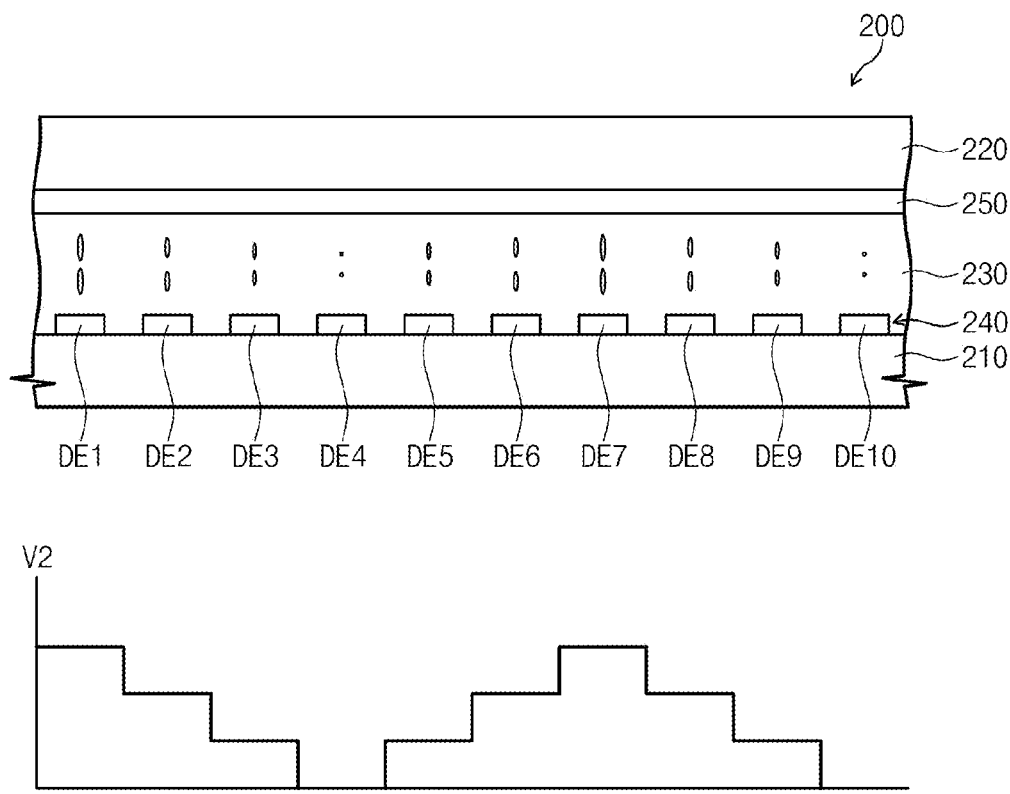
FIG. 6B is a cross-sectional view showing an exemplary embodiment of a liquid crystal lens panel operated in a second mode with a second driving voltage.

FIG. 6A is a cross-sectional view showing an exemplary embodiment of the liquid crystal lens panel operated in the first mode with a first driving voltage, and FIG. 6B is a cross-sectional view showing an exemplary embodiment of the liquid crystal lens panel operated in the second mode with a second driving voltage.

Referring to FIG. 6A, when the liquid crystal lens panel 200 operates in the first mode, the driving electrodes, e.g., a first driving electrode DE1 to a tenth driving electrode DE10 are applied with the first driving voltage V1. The first driving voltage V1 is increased in a step up manner between the first driving electrode DE1 and the fourth driving electrode DE4, decreased in a step down manner between the fourth driving electrode DE4 and the seventh driving electrode DE7, and increased in the step up manner between the seventh driving electrode DE7 and the tenth driving electrode DE10.

The liquid crystal molecules of the liquid crystal layer 230 corresponding to the driving electrodes DE1 to DE10 are aligned from a horizontal alignment direction to a vertical alignment direction or vice versa based on the first driving voltage V1. In one exemplary embodiment, for example, when the liquid crystal lens panel 200 operates in the first mode, the liquid crystal molecules of the liquid crystal layer 230 are horizontally aligned in the area corresponding to the first driving electrode DE1 and the alignment of the liquid crystal molecules are gradually changed from the horizontal alignment direction to the vertical alignment direction, and thus the liquid crystal molecules of the liquid crystal layer 230 are vertically aligned in the area corresponding to the fourth driving electrode DE4.

The liquid crystal lens panel 200 that operates in the first mode provides the image displayed through the first pixels PX1 (shown in FIG. 3) to the right eye of the viewer and provides the image displayed through the second pixels PX2 (shown in FIG. 3) to the left eye of the viewer.

Referring to FIG. 6B, when the liquid crystal lens panel 200 operates in the second mode, the driving electrodes DE1 to DE10 are applied with the second driving voltage V2. The second driving voltage V2 is decreased in the step down manner between the first driving electrode DE1 and the fourth driving electrode DE4, increased in the step up manner between the fourth driving electrode DE4 and the seventh driving electrode DE7, and decreased in the step down manner between the seventh driving electrode DE7 and the tenth driving electrode DE10.

The liquid crystal molecules of the liquid crystal layer 230 corresponding to the driving electrodes DE1 to DE10 are aligned from the horizontal alignment direction to the vertical alignment direction or vice versa based on the second driving voltage V2. In one exemplary embodiment, for example, when the liquid crystal lens panel 200 operates in the second mode, the liquid crystal molecules of the liquid crystal layer 230 are vertically aligned in the area corresponding to the first driving electrode DE1, and the alignment of the liquid crystal molecules are gradually changed from the vertical alignment direction to the horizontal alignment direction, and thus the liquid crystal molecules of the liquid crystal layer 230 are horizontally aligned in the area corresponding to the fourth driving electrode DE4.

The liquid crystal lens panel 200 that operates in the second mode provides the image displayed through the second pixels PX2 (shown in FIG. 3) to the right eye of the viewer and provides the image displayed through the first pixels PX1 (shown in FIG. 3) to the left eye of the viewer.

An exemplary embodiment of the liquid crystal lens panel 200 and the driving voltage is not limited to those shown in FIGS. 5, 6A and 6B. In an alternative exemplary embodiment, the liquid crystal lens panel 200 and the driving voltage may be variously changed to provide the images displayed in different pixels to the left eye or the right eye of the viewer during the first and second modes.

Referring to FIGS. 4A to 6B, in an exemplary embodiment, the liquid crystal lens panel 200 operates in the first mode when the display panel 100 displays the positive frame image RL, and operates in the second mode when the display panel 100 displays the negative frame image LR.

In an exemplary embodiment, when the display panel 100 displays the positive frame image RL, the liquid crystal lens panel 200 that operates in the first mode provides the first right-eye image R1 to the right eye of the viewer and provides the first left-eye image L1 to the left eye of the viewer.

In such an embodiment, when the display panel 100 displays the negative frame image LR, the liquid crystal lens panel 200 that operates in the second mode provides the second right-eye image R2 to the right eye of the viewer and provides the second left-eye image L2 to the left eye of the viewer.

Hereinafter, an operation of an exemplary embodiment of the 3D image display device according to the invention will be described in detail with reference to FIGS. 2, 7 and 8.

FIG. 7 is a signal timing diagram showing a vertical start signal, gate signals, a frame data, a mode change signal, an operation mode of the liquid crystal lens panel, and a backlight-on signal of an exemplary embodiment of the 3D image display device according to the invention, and FIG. 8 is a view showing the frame image corresponding to the frame data of FIG. 7.

The exemplary embodiment of the display panel 100 shown in FIGS. 7 and 8 may have a driving frequency of about 240 hertz (Hz). In such an embodiment, the display panel 100 displays one frame image during 1/240 second.

Pulses of the vertical start signal STV are output every 1/240 second. When the vertical start signal STV is output, the gate driver GCP sequentially applies the gate signals GS1 to GSk to the gate lines G1 to Gk during one frame, i.e., about 1/240 second.

The frame data DATA includes the positive frame data RL_data and the negative frame data LR_data. In an exemplary embodiment, the positive frame data RL_data includes a first positive frame data RL1_data and a second positive frame data RL2_data, and the negative frame data LR_data includes a first negative frame data LR1_data and a second negative frame data LR2_data. The images displayed using the positive frame data RL_data and the negative frame data LR_data may be a positive frame image RL and a negative frame image LR, respectively. In an exemplary embodiment, the images displayed using the first positive frame data RL1_data, the second positive frame data RL2_data, the first negative frame data LR1_data and the second negative frame data LR2_data may be a first positive frame image RL1, a second positive frame image RL2, a first negative frame image LR1 and a second negative frame image LR2, respectively.

The display panel 100 sequentially displays the first positive frame image RL1 and the first negative frame image LR1 during an n-th frame period (n is a natural number) and sequentially displays the second negative frame image LR2 and the second positive frame image RL2 during an (n+1)-th frame period. In such an embodiment, a frame period may be defined by four frames.

The image is changed from the first positive frame image RL1 to the first negative frame image LR1 in the n-th frame period, and the image is changed from the second negative frame image LR2 to the second positive frame image RL2 in the (n+1)-th frame period.

In an exemplary embodiment, during the n-th frame period, the first positive frame data RL1_data is output twice, and then the first negative frame data LR1_data is output twice. In such an embodiment, during the (n+1)-th frame period, the second positive frame data RL2_data is output twice after the second negative frame data LR2_data is output twice.

In such an embodiment, although not shown in figures, a third positive frame data may be output twice after a third negative frame data is output twice during an (n−1)-th frame period, and a fourth negative frame data may be output twice after a fourth positive frame data is output twice during an (n+2)-th frame period.

In an exemplary embodiment, when a time period in which the liquid crystal lens panel 200 is maintained in a same operation mode is defined as one period, the driving frequency of the liquid crystal lens panel 200 is one fourth of the driving frequency of the display panel 100. In FIG. 7, the driving frequency of the liquid crystal lens panel 200 is about 60 Hz. Accordingly, the operation mode of the liquid crystal lens panel 200 is changed every 1/60 second.

The operation mode of the liquid crystal lens panel 200 is changed at the time point at which the positive frame image RL is changed to the negative frame image LR and the time point at which the negative frame image LR is changed to the positive frame image RL.

The mode change signal LMS is output substantially immediately before the time point at which the positive frame image RL is changed to the negative frame image LR and the time point at which the negative frame image LR is changed to the positive frame image RL. In such an embodiment, each of the positive frame image RL and the negative frame image LR is output twice during the n-th frame period or the (n+1)-th frame period, and the mode change signal LMS is thereby output substantially immediately before the time point corresponding to a half of each of the n-th frame period and the (n+1)-th frame period.

In FIG. 7, the mode change signal LMS is output substantially immediately before the time point, e.g., about $2/240$ second, at which the first negative frame data LR1_data is output, and the time point, e.g., about $6/240$ second, at which the second positive frame data RL2_data is output.

In an exemplary embodiment, when the mode change signal LMS is output, the operation mode of the liquid crystal lens panel 200 is changed from the first mode to the second mode or vice versa. As shown in FIG. 7, the liquid crystal lens panel 200 operates in the first mode between zero (0) second and $2/240$ second, operates in the second mode between $2/240$ second to $6/240$ second, and operates in the first mode between $6/240$ second to $8/240$ second. In such an embodiment, the viewer perceives the left-eye image through the left eye and the right-eye image through the right eye during substantially an entire frame period by changing of the operation mode of the liquid crystal lens panel 200.

The backlight-on signal BLU_ON is output during a portion of the time period, in which the positive frame image RL is displayed, and a portion of the time period, in which the negative frame image LR is displayed. When the backlight-on signal BLU_ON is output, the backlight unit 300 provides the light to the display panel 100 during the turn-on period Δt, which is corresponding to the pulse width of the backlight-on signal BLU_ON.

Each of the first positive frame image RL1, the second positive frame image RL2, the first negative frame image LR1 and the second frame image LR2 includes an initial frame image and a later frame image in accordance with the display order.

The turn-on period Δt of the backlight-on signal BLU_ON may correspond to at least a portion of the time period in which the later frame image is displayed. As shown in FIGS. 7 and 8, the turn-on period Δt corresponds to the portion of the time period from $1/240$ second to $2/240$ second, the portion of the time period from $3/240$ second to $4/240$ second, the portion of the time period from $5/240$ second to $6/240$ second, and the portion of the time period from $7/240$ second to $8/240$ second.

The turn-on period Δt is determined based on image confusion and a delay of the frame image, which are caused by the response speed of the liquid crystal lens panel 200.

In an exemplary embodiment, as shown in FIGS. 7 and 8, each of the positive frame image RL1, the second positive frame image RL2, the first negative frame image LR1 and the second negative frame image LR2 is output twice, but the invention is not limited thereto or thereby. In an alternative exemplary embodiment, each of the positive frame image RL1, the second positive frame image RL2, the first negative frame image LR1 and the second negative frame image LR2 may be output three times or more.

In an exemplary embodiment, the operation mode of the liquid crystal lens panel 200 is changed at the time point at which the positive frame image RL is changed to the negative frame image LR and the time point at which the negative frame image LR is changed to the positive frame image RL.

In an alternative exemplary embodiment, the driving frequency of the liquid crystal lens panel 200 may be smaller than the frequency of about 60 Hz. In an exemplary embodiment, where each of the positive frame image RL1, the second positive frame image RL2, the first negative frame image LR1 and the second negative frame image LR2 is output three times or more, the driving frequency of the liquid crystal lens panel 200 may be about 40 Hz and the operation mode of the liquid crystal lens panel 200 may be changed every $1/40$ second.

Figure 9A:
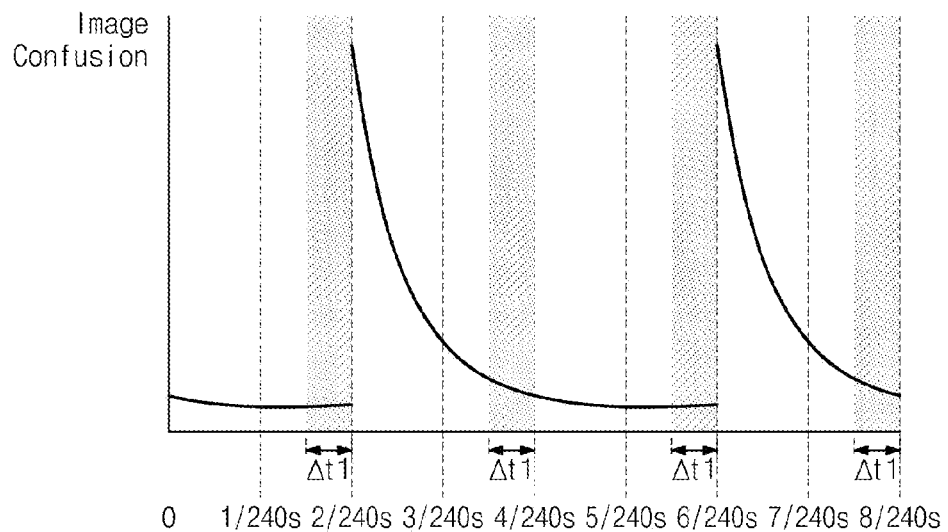
FIGS. 9A and 9B are views showing level of an image confusion caused by the liquid crystal lens panel according to period and a turn-on period of the backlight-on signal.
Figure 9B:
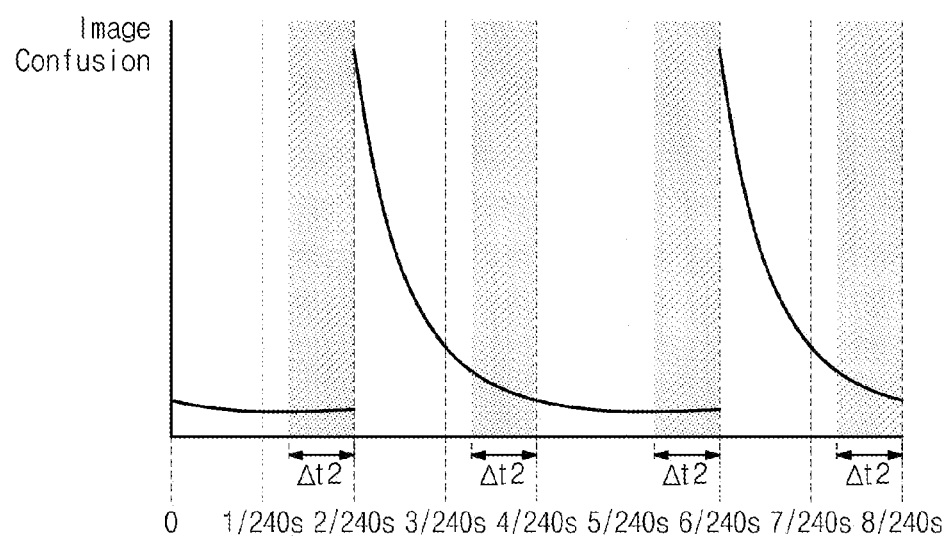

FIGS. 9A and 9B are views showing level of an image confusion caused by the liquid crystal lens panel according to period and a turn-on period of the backlight-on signal.

Referring to FIGS. 9A and 9B, in an exemplary embodiment, where the liquid crystal lens panel 200 has a slow response time, the image confusion period may occur. In such an embodiment, a portion of the left-eye image may be perceived by the right eye of the viewer and a portion of the right-eye image may be perceived by the left eye.

A level of the image confusion is substantially high when the operation mode of the liquid crystal lens panel 200 is changed from the first mode to the second mode or vice versa, and the level of the image confusion is gradually lowered thereafter. Referring to FIGS. 9A and 9B, the level of the image confusion of the liquid crystal lens panel 200 is substantially high between $2/240$ second and $6/240$ second and gradually lowered.

In a conventional 3D image display device, the positive frame image and the negative frame image are alternately displayed in a same order in both of the n-th frame period and the (n+1)-th frame period. Accordingly, the driving frequency of the liquid crystal lens panel of the conventional 3D image display device is about 120 Hz and the operation mode of the liquid crystal lens panel is changed every $2/240$ second when the driving frequency of the display panel of the conventional 3D image display device is about 240 Hz. Therefore, the level of the image confusion is relatively high in the conventional 3D image display device.

In an exemplary embodiment of the 3D image display device, the positive frame image and the negative frame image are sequentially displayed in the n-th frame period, and the negative frame period and the positive frame period are sequentially displayed in the (n+1)-th frame period. Thus, in such an embodiment, the driving frequency of the liquid crystal lens panel 200 may be about 60 Hz, and the operation mode of the liquid crystal lens panel 200 may be changed every $1/240$ second when the driving frequency of the display panel 100 is about 240 Hz. As described above, the number of the operation mode changes in the liquid crystal lens panel 200 is substantially reduced when compared to the number of the operation mode changes in the liquid crystal lens panel of the convention liquid crystal lens panel, thereby substantially reducing the image confusion phenomenon.

Referring to FIG. 9A, when the turn-on period Δt1 of the backlight-on signal BLU_ON of an exemplary embodiment of the 3D image display device according to the invention is set to the same value as a turn-on period Δt1 of the backlight-on signal of the conventional 3D image display device, the image confusion period caused by the liquid crystal lens panel 200 is reduced by about 4.6%.

Referring to FIG. 9B, the image confusion phenomenon is affected by not only the liquid crystal lens panel 200 but also the turn-on period of the backlight-on signal BLU_ON. Accordingly, when the turn-on period Δt1 of the backlight-on signal BLU_ON of an exemplary embodiment of the 3D image display device according to the invention is set to a value greater than the turn-on period Δt1 of the backlight-on signal of the conventional 3D image display device, and the level of the image confusion is maintained in the same as a level of the image confusion of the conventional 3D image display device, brightness of the display panel 100 is improved by about 15%.

Hereinafter, an alternative exemplary embodiment of a 3D image display device according to the invention will be described.

An alternative exemplary embodiment of the 3D image display device is substantially the same as the exemplary embodiment of the 3D image display device described above except for the frame image and the backlight-on signal. Accordingly, hereinafter the frame image and the backlight-on signal of an alternative exemplary embodiment of a 3D image display device will be described in detail, and any repetitive detailed description thereof will be omitted.

Figure 11:
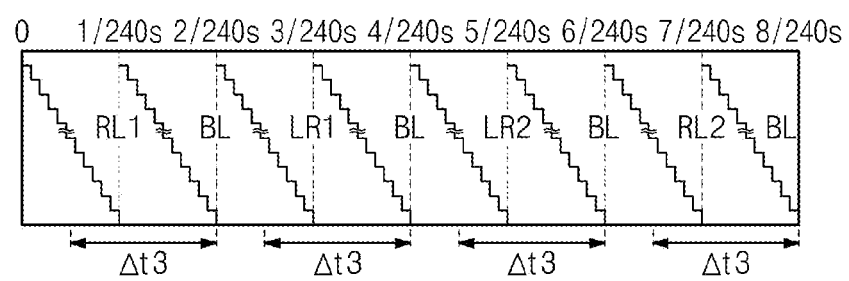
FIG. 11 is a view showing a frame image corresponding to the frame data of FIG. 10.

FIG. 10 is a signal timing diagram showing a vertical start signal, gate signals, a frame data, a mode change signal, an operation mode of the liquid crystal lens panel, and a backlight-on signal of an alternative exemplary embodiment of a 3D image display device according to the invention, and FIG. 11 is a view showing a frame image corresponding to the frame data of FIG. 10.

Referring to FIGS. 10 and 11, in an exemplary embodiment, the frame data DATA1 includes a positive frame data RL_data, a negative frame data LR_data and a black data B_data. In such an embodiment, the positive frame data RL_data includes a first positive frame data RL1_data and a second positive frame data RL2_data, and the negative frame data LR_data includes a first negative frame data LR1_data and the second negative frame data LR2. The images displayed using the positive frame data RL_data, the negative frame data LR_data and the black data B_data may respectively correspond to a positive frame image RL, a negative frame image LR and a black image BL. In such an embodiment, the images displayed using the first positive frame data RL1_data, the second positive frame data RL2_data, the first negative frame data LR1_data and the second negative frame data LR2_data may be a first positive frame image RL1, a second positive frame image RL2, a first negative frame image LR1 and a second negative image LR2, respectively.

The display panel 100 displays the black image BL between the positive frame image RL and the negative frame image LR.

In an exemplary embodiment, the first positive frame data RL1_data, the black data B_data, the first negative frame data LR1_data and the black data B_data are sequentially output during the n-th frame period. In such an embodiment, the second negative frame data LR2_data, the black data B_data, the second positive frame data RL2_data and the black data B_data are sequentially output during the (n+1)-th frame period.

The backlight-on signal BLU_ON1 is output during a time period in which the black image BL is displayed, a portion of a time period in which the positive frame image RL is displayed and a portion a time period in which the negative frame image LR is displayed. When the backlight-on signal BLU_ON1 is output, the backlight unit 300 provides the light to the display panel 100 during the turn-on period Δt3, which corresponds to the pulse width of the backlight-on signal BLU_ON1.

In an exemplary embodiment, the backlight-on signal BLU_ON1 is output during the time period in which the black image BL is displayed. As shown in FIGS. 10 and 11, the turn-on period Δt3 corresponds to a portion of the time period from 0/240 second to 1/240 second, the time period from 1/240 second to 2/240 second, a portion of the time period from 2/240 second to 3/240 second, the time period from 3/240 second to 4/240 second, a portion of the time period from 4/240 second to 5/240 second, the time period from 5/240 second to 6/240 second, a portion of the time period from 6/240 second to 7/240 second, and the time period from 7/240 second to 8/240 second.

As described above, in an exemplary embodiment, the 3D image display device outputs the black data B_data between the positive frame data RL_data and the negative frame data LR_data, and thus the image confusing phenomenon may be further reduced. In an exemplary embodiment, as shown in FIG. 10, the backlight-on signal BLU_ON1 of the 3D image display device has the turn-on period Δt3 longer than the turn-on period Δt of the 3D image display device of FIG. 7, such that the brightness is effectively prevented from decreasing even though the black image BL is displayed.

Hereinafter, another alternative exemplary embodiment of a 3D image display device according to the invention will be described.

Figure 12:
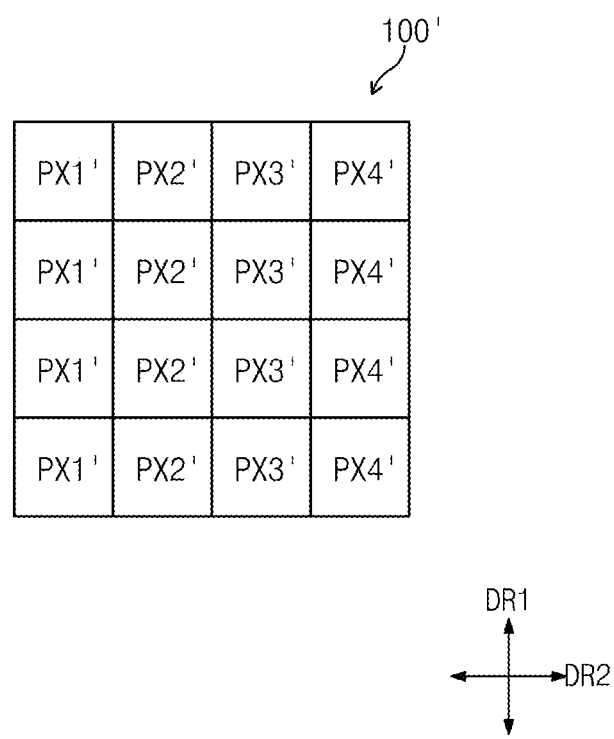
FIG. 12 is a plan view showing a portion of an alternative exemplary embodiment of a 3D image display device according the invention.

FIG. 12 is a plan view showing a portion of another alternative exemplary embodiment of a 3D image display device 100' according the invention.

The 3D image display device of FIG. 12 is substantially the same as the 3D image display device of FIGS. 1 to 3 except for the frame image displayed on the display panel. The frame image of the 3D image display device of FIGS. 1 to 3 includes the left-eye image and the right-eye image, i.e., two view-point images, while the frame image of the 3D image display device of FIG. 12 has multi-view point images. Here, the multi-view point image means an image obtained by combining images taken at different angles. Accordingly, hereinafter the frame image will be described in detail.

The display panel 100' includes h pixels different from each other (h is a natural number equal to or greater than 2). In an exemplary embodiment, as shown in FIG. 12, the "h" is 4.

Referring to FIG. 12, the display panel 100' includes a first pixel PX1', a second pixel PX2', a third pixel PX3' and a fourth pixel PX4'.

As shown in FIG. 12, each of the first pixel PX1', the second pixel PX2', the third pixel PX3' and the fourth pixel PX4' is successively arranged in the first direction DR1, and the first pixel PX1', the second pixel PX2', the third pixel PX3' and the fourth pixel PX4' are sequentially arranged in the second direction DR2 in each row. Although not shown in FIG. 12, the pixels are repeatedly arranged in the second direction DR2 by the unit of four pixels.

Figure 13A:
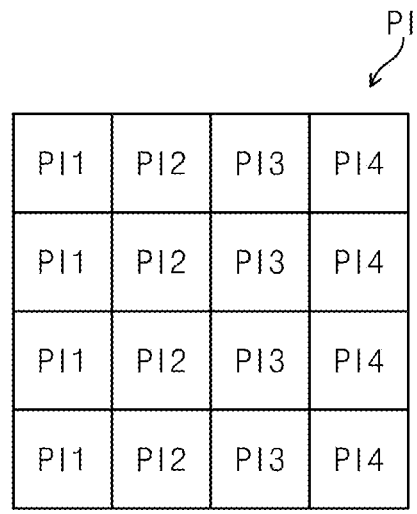
FIG. 13A is a plan view showing a positive frame image displayed on the display panel shown in FIG. 12.
Figure 13B:
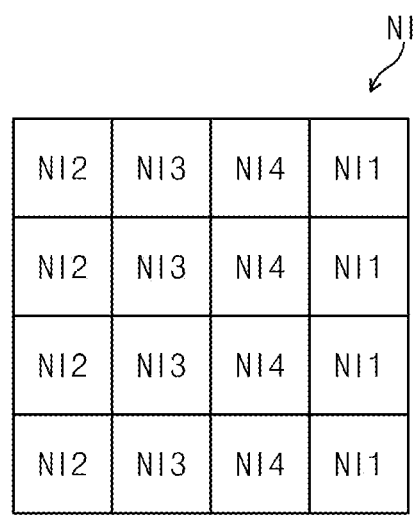
FIG. 13B is a plan view showing a negative frame image displayed on the display panel shown in FIG. 12.

FIG. 13A is a plan view showing a positive frame image PI displayed on the display panel 100' shown in FIG. 12, and FIG. 13B is a plan view showing a negative frame image NI displayed on the display panel 100' shown in FIG. 12.

Referring to FIGS. 12, 13A and 13B, the display panel 100' displays the frame image. The frame image includes the positive frame image PI and the negative frame image NI.

Each of the positive frame image PI and the negative frame image NI includes multi-view point images.

The positive frame image PI includes first to h-th positive multi-view point images having different view points and being displayed in a first order through the h pixels. As shown in FIG. 13A, the positive frame image PI includes first to fourth positive multi-view point images PI1 to PI4 having different view points and being displayed in the first order through the first to fourth pixels PX1' to PX4'.

The negative frame image NI includes first to h-th negative multi-view point images NI1 to NI4 having different view points and being displayed in a second order different from the first order through the h pixels. As shown in FIG. 13B, the negative frame image NI includes first to fourth negative multi-view point images NI1 to NI4 having different view points and being displayed in the second order through the first to fourth pixels PX1' to PX4'.

In an exemplary embodiment, the first order may be an ascending order. Thus, the first to fourth positive multi-view point images PI1 to PI4 are respectively displayed in the PX1' to PX4' in the order of the first, second, third and fourth positive multi-view point images PI1 to PI4.

In an exemplary embodiment, the second order may be an ascending order in which the negative multi-view point images, which is equal to or greater than 1 and equal to or smaller than h−1, are shifted. As shown in FIG. 13B, the second order is the ascending order in which one negative multi-view point image is shifted to a left side. Thus, the second negative multi-view point image NI2, the third negative multi-view point image NI3, the fourth negative multi-view point image NI4 and the first negative multi-view point image NI1 are respectively displayed through the first to fourth pixels PX1' to PX4' in the order of the second negative multi-view point image NI2, the third negative multi-view point image NI3, the fourth negative multi-view point image NI4 and the first negative multi-view point image NI1.

In an exemplary embodiment, the liquid crystal lens panel (not shown) may provide an i-th positive multi-view point image (i is a natural number equal to or greater than 1 and equal to or smaller than h) among the first to h-th positive multi-view point images and a j-th negative multi-view point image (j is a natural number equal to or greater than 1, equal to or smaller than h, and not equal to j) among the first to h-th negative multi-view point images to the right eye of the viewer. In such an embodiment, the liquid crystal lens panel (not shown) may provide a j-th positive multi-view point image among the first to h-th positive multi-view point images and an i-th negative multi-view point image among the first to h-th negative multi-view point images to the left eye of the viewer.

In such an embodiment, one of the first to fourth positive multi-view point images PI1 to PI4 and one of the first to fourth negative multi-view point images NI1 to NI4, which are in an one-to-one correspondence with the first to fourth positive multi-view point images PI1 to PI4, are provided to the left eye or the right eye of the viewer. In an exemplary embodiment, when the second positive multi-view point image PI2 is provided to the right eye of the viewer and the third positive multi-view point image PI3 is provided to the left eye of the viewer, the second negative multi-view point image NI2 is provided to the right eye and the third negative multi-view point image NI3 is provided to the left eye of the viewer. In such an embodiment, the first positive multi-view point image PI1, the fourth positive multi-view point image PI4, the first negative multi-view point image NI1 and the fourth negative multi-view point image NI4 may be not perceived by the viewer.

Hereinafter, the frame image perceived by the viewer in accordance with the operation mode of the liquid crystal lens panel will be described.

An exemplary embodiment of the liquid crystal lens panel operates in the first mode or the second mode different from the first mode, and the position of the viewer may be changed.

Figure 14A:
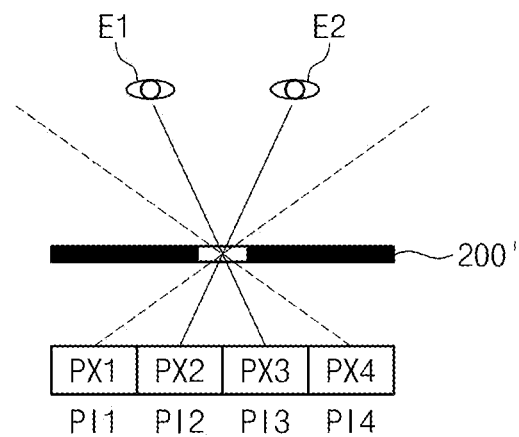
FIGS. 14A and 14B are views showing images perceived by a viewer in accordance with the operation mode of the liquid crystal lens panel when the viewer is at a first position.
Figure 14B:
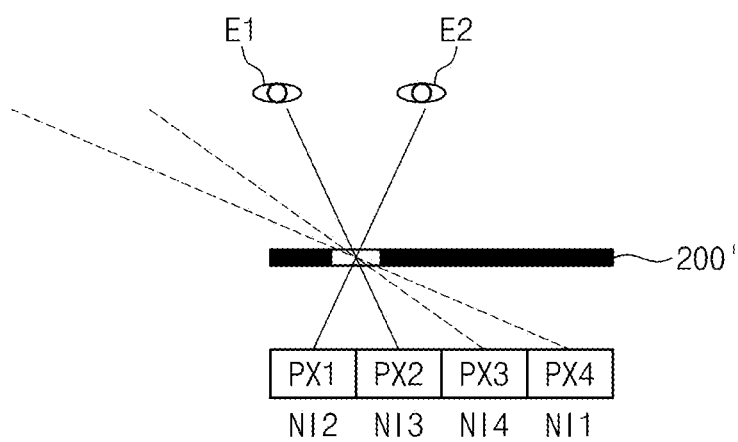
Figure 15A:
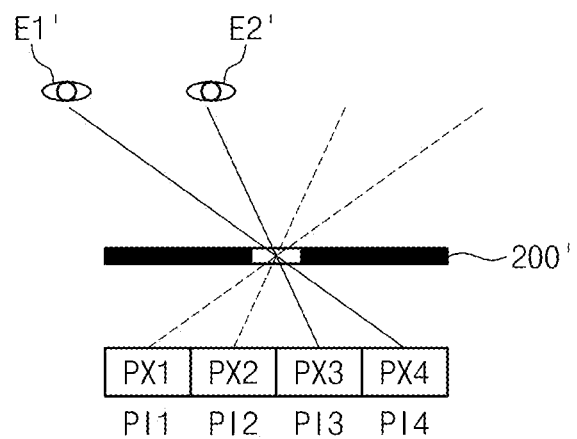
FIGS. 15A and 15B are views showing images perceived by a viewer in accordance with the operation mode of the liquid crystal lens panel when the viewer is at a second position.
Figure 15B:
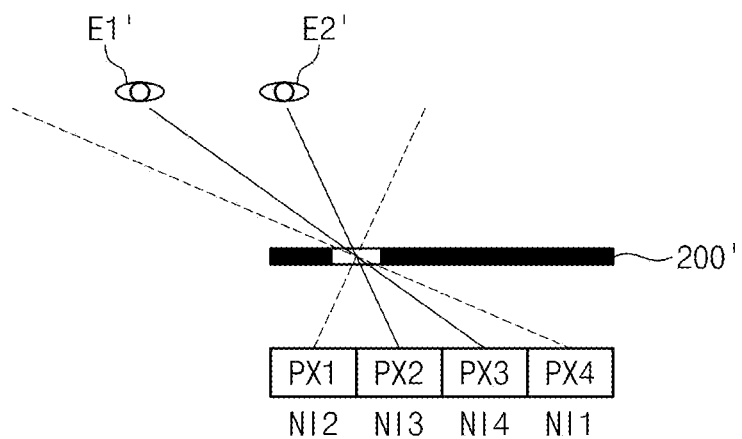

FIGS. 14A and 14B are views showing images perceived by the viewer in accordance with the operation mode of the liquid crystal lens panel 200' when the viewer is at a first position, and FIGS. 15A and 15B are views showing images perceived by the viewer in accordance with the operation mode of the liquid crystal lens panel 200' when the viewer is at a second position.

FIG. 14A shows the liquid crystal lens panel 200' that operates in the first mode, and FIG. 14B shows the liquid crystal lens panel 200' that operates in the second mode.

Referring to FIG. 14A, the liquid crystal lens panel 200' that operates in the first mode provides the second positive multi-view point image PI2 displayed in the second pixel PX2 to the right eye E2 of the viewer and the third positive multi-view point image PI3 displayed in the third pixel PX3 to the left eye E1 of the viewer.

Referring to FIG. 14B, the liquid crystal lens panel 200' that operates in the second mode provides the second negative multi-view point image NI2 displayed in the first pixel PX1 to the right eye E2 of the viewer and the third negative multi-view point image NI3 displayed in the second pixel PX2 to the left eye E1 of the viewer. Thus, the viewer perceives the 3D image.

In such an embodiment, the position of the viewer may be shifted from the first position to the second position as shown in FIGS. 15A and 15B. FIGS. 15A and 15B show the position of the viewer shifted to the left direction from the first position by a distance between two eyes of the viewer. FIG. 15A shows the liquid crystal lens panel 200' that operates in the first mode, and FIG. 15B shows the liquid crystal lens panel 200' that operates in the second mode.

Referring to FIG. 15A, the liquid crystal lens panel 200' that operates in the first mode provides the third positive multi-view point image PI3 displayed in the third pixel PX3 to the right eye E2' of the viewer and provides the fourth positive multi-view point image PI4 displayed in the fourth pixel PX4 to the left eye E1' of the viewer.

Referring to FIG. 15B, the liquid crystal lens panel 200' that operates in the second mode provides the third negative multi-view point image NI3 displayed in the second pixel PX2 to the right eye E2' of the viewer and provides the fourth negative multi-view point image NI4 displayed in the third pixel PX3 to the left eye E1' of the viewer. Thus, the viewer perceives the 3D image.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A three-dimensional (3D) image display device comprising:
   a display panel which comprises a first pixel and a second pixel different from the first pixel, wherein the display panel displays a frame image, which comprises: a positive frame image comprising a first right-eye image displayed in the first pixel and a first left-eye image displayed in the second pixel; and a negative frame image comprising a second left-eye image displayed in the first pixel and a second right-eye image displayed in the second pixel; and
   a liquid crystal lens panel disposed on the display panel, wherein the liquid crystal lens panel provides the first and second right-eye images to a right eye of a viewer and provides the first and second left-eye images to a left eye of the viewer,
   wherein the display panel displays the positive frame image and the negative frame image during an n-th frame period in the order of the positive frame image and the negative frame image, and displays the negative frame image and the positive frame image during an (n+1)-th frame image in the order of the negative frame image and the positive frame image, wherein n is a natural number.

2. The 3D image display device of claim 1, wherein an image displayed by the display panel is changed from one of the positive frame image and the negative frame image to the other of the positive frame image and the negative frame image once in the n-th frame period or the (n+1)-th frame period.

3. The 3D image display device of claim 1, wherein the liquid crystal lens panel has a driving frequency equal to or lower than one-fourth of a driving frequency of the display panel when a time period in which the liquid crystal lens panel is maintained in a same operation mode is defined as one period.

4. The 3D image display device of claim 3, wherein an operation mode of the liquid crystal lens panel is changed at a time point at which the positive frame image is changed to the negative frame image and at a time point at which the negative frame image is changed to the positive frame image.

5. The 3D image display device of claim 3, wherein an operation mode of the liquid crystal lens panel is changed at a time point corresponding to a half of each of the n-th frame period and the (n+1)-th frame period.

6. The 3D image display device of claim 1, wherein the liquid crystal lens panel comprises:
a first substrate;
a second substrate disposed opposite to the first substrate;
a first electrode layer disposed on the first substrate and comprising a plurality of driving electrodes spaced apart from each other, wherein the first electrode layer receives a driving voltage;
a second electrode layer disposed on the second substrate and disposed opposite to the first electrode layer, wherein the second electrode layer receives a common voltage; and
a liquid crystal layer disposed between the first substrate and the second substrate.

7. The 3D image display device of claim 6, wherein
the liquid crystal lens panel operates in a first mode or a second mode,
the liquid crystal lens panel provides the image displayed in the first pixel to the right-eye of the viewer and provides the image displayed in the second pixel to the left eye of the viewer when the liquid crystal lens panel operates in the first mode, and
the liquid crystal lens panel provides the image displayed in the second pixel to the right eye of the viewer and provides the image displayed in the first pixel to the left eye of the viewer when the liquid crystal lens panel operates in the second mode.

8. The 3D image display device of claim 7, wherein the driving voltage when the liquid crystal lens panel operates in the first mode is different from the driving voltage when the liquid crystal lens panel operates in the second mode.

9. The 3D image display device of claim 1, further comprising:
a backlight unit which provides light to the display panel during a portion of a time period during which the positive frame image is displayed and a portion of a time period during which the negative frame image is displayed.

10. The 3D image display device of claim 9, wherein
the positive frame image comprises a first positive frame image and a second positive frame image different from the first positive frame image,
the negative frame image comprises a first negative frame image and a second negative frame image different from the first negative frame image, and
the display panel sequentially displays the first positive frame image and the first negative frame image during the n-th frame period and sequentially displays the second negative frame image and the second positive frame image during the (n+1)-th frame period.

11. The 3D image display device of claim 10, wherein the display panel consecutively displays each of the first positive frame image, the second positive frame image, the first negative frame image and the second negative frame image twice.

12. The 3D image display device of claim 11, wherein
each of the first positive frame image, the second positive frame image, the first negative frame image and the second negative frame image comprises an initial frame image and a later frame image which is displayed after the initial frame image, and
the backlight unit provides the light to the display panel during a portion of a time period during which the later frame image is displayed.

13. The 3D image display device of claim 9, wherein the display panel displays a black image between the positive frame image and the negative frame image.

14. The 3D image display device of claim 13, wherein the backlight unit provides the light to the display panel during a time period during which the black image is displayed, the portion of the time period during which the positive frame image is displayed, and the portion of the time period during which the negative frame image is displayed.

15. The 3D image display device of claim 1, wherein
the display panel has a driving frequency of 240 Hz, and
the liquid crystal lens panel has a driving frequency of 60 Hz.

16. The 3D image display device of claim 1, wherein
the display panel has a driving frequency of 360 Hz, and
the liquid crystal lens panel has a driving frequency of 40 Hz.

17. A three-dimensional (3D) image display device comprising:
a display panel which comprises h pixels and displays a frame image, wherein h is a natural number equal to or greater than 2, and the frame image comprises: a positive frame image comprising first to h-th positive multi-view point images displayed through the h pixels in a first order and having different view points from each other; and a negative frame image comprising first to h-th negative multi-view point images displayed through the h pixels in a second order and having different view points from each other; and
a liquid crystal lens panel disposed on the display panel, wherein the liquid crystal lens panel provides an i-th positive multi-view point image among the first to h-th positive multi-view point images and a j-th negative multi-view point image among the first to h-th negative multi-view point images to a right eye of a viewer and provide a j-th positive multi-view point image among the first to h-th positive multi-view point images and an i-th negative multi-view point image among the first to h-th negative multi-view point images to a left eye of the viewer, wherein i is a natural number equal to or less than h, and j is a natural number equal to or less than h and different from i,
wherein the display panel sequentially displays the positive frame image and the negative frame image during an n-th frame period and sequentially displays the negative frame image and the positive frame image during an (n+1)-th frame period, wherein n is a natural number.

18. The 3D image display device of claim 17, wherein one of the first to h-th positive multi-view point images and one of the first to h-th negative multi-view point images, which is in one-to-one correspondence with the first to h-th positive multi-view point images, are provided to the left eye or the right eye of the viewer.

19. The 3D image display device of claim 18, wherein
the first order is an ascending order, and
the second order is an ascending order, in which k negative multi-view point images are shifted, wherein k is a natural number equal to or less than h−1.

20. The 3D image display device of claim 19, wherein
an image displayed by the display panel is changed from one of the positive frame image and the negative frame image to the other of the positive frame image and the negative frame image once in the n-th frame period or the (n+1)-th frame period.

21. The 3D image display device of claim 17, wherein
the liquid crystal lens panel has a driving frequency equal to or lower than one-fourth of a driving frequency of the display panel when a time period in which the liquid crystal lens panel is maintained in a same operation mode is defined as one period.

22. The 3D image display device of claim 21, wherein
an operation mode of the liquid crystal lens panel is changed at a time point at which the positive frame image is changed to the negative frame image and at a time point at which the negative frame image is changed to the positive frame image.

* * * * *